United States Patent [19]
Peha et al.

[11] Patent Number: 5,562,130
[45] Date of Patent: Oct. 8, 1996

[54] HAZARDOUS CHEMICAL TRANSFER MODULE

[75] Inventors: Robert D. Peha, Bellevue, Wash.; James A. Dreyfuss, Prospect, Conn.; Richard McNealy, McKinney, Tex.

[73] Assignees: Olin Corporation, Cheshire, Conn.; Anderson Columbiana Trading of Texas, McKinney, Tex.

[21] Appl. No.: 405,124

[22] Filed: Mar. 16, 1995

[51] Int. Cl.⁶ .................. B65B 1/04; B65B 3/04; B67C 3/02
[52] U.S. Cl. .................. 141/98; 141/67; 141/4; 141/5; 141/8; 244/135 R; 137/205
[58] Field of Search .................. 141/1, 4, 5, 8, 141/65, 67, 94, 54, 59, 61, 98; 244/135 A, 135 R; 137/205, 209, 238

[56] References Cited

U.S. PATENT DOCUMENTS

| | | |
|---|---|---|
| 2,389,413 | 11/1945 | Carlton .................. 137/78 |
| 3,138,291 | 6/1964 | Reed et al. .................. 222/72 |
| 3,200,993 | 8/1965 | Headrick .................. 222/72 |
| 4,609,169 | 9/1986 | Schweickert et al. .................. 244/169 |
| 4,637,440 | 1/1987 | Potter .................. 141/65 |
| 4,660,602 | 4/1987 | Draman .................. 137/899.4 |
| 5,383,499 | 1/1995 | Mattern .................. 141/65 |
| 5,404,923 | 4/1995 | Yamamoto et al. .................. 244/135 R |

Primary Examiner—Henry J. Recla
Assistant Examiner—Timothy L. Maust
Attorney, Agent, or Firm—Gregory S. Rosenblatt

[57] ABSTRACT

A self-contained, hermetic module for the transport of hazardous fluids such as space craft fuels. The module includes a base and a removable cover hermetically sealed to the base. The combination of the base and the cover define an enclosure. Located within this enclosure are a pressurized gas cylinder, a fuel tank and an evacuated vessel. An inert gas contained within the pressurized vessel expels a fuel contained in the fuel tank to fill the space craft. The evacuated vessel purges all lines and conduits to prevent hazardous fluids from escaping to the environment.

19 Claims, 4 Drawing Sheets

HAZARDOUS CHEMICAL TRANSFER MODULE

FIELD OF THE INVENTION

This invention relates to a self-contained, portable module for transporting hazardous materials. More particularly, the module is used to transfer fuel to a space craft.

DESCRIPTION OF THE PRIOR ART

Existing space craft fueling systems are designed independently of the hypergole fuels. The fueling system normally does not contain a fuel container, rather, transfers fuel from a fuel storage container, such as a drum or a tank, to the space craft. A complicated array of controls, valves, gauges and scales is required to ensure that the appropriate mass of fuel is delivered to the space craft fuel tanks.

Hydrazine, a commonly utilized space craft propellant, has a relatively high vapor pressure at ambient temperatures (typically 20° C.–30° C.). To prevent contamination of the environment, the fuel transport system includes scrubbers to minimize the amount of vapors that leak to the atmosphere. These scrubber systems are not always reliable and when saturated, the scrubbing media must be removed and treated as a hazardous waste.

The existing fuel systems do not satisfactorily provide a barrier to protect operators in the event of a fuel leak and the risk of operator exposure to fuel vapors is present. Additionally, after fueling is completed, the lines must be flushed to remove excess fuel. The flushed fuel, along with the flushing medium, is a hazardous waste that must be safely disposed and prevented from interacting with the environment.

There exists, therefore, a need for a space craft fueling system that does not suffer the disadvantages of the prior art.

SUMMARY OF THE INVENTION

Accordingly, it is an object of the invention to provide a self-contained, transport module for hazardous fluids, such as space craft fuels. It is a feature of the invention that the fuels are contained within the module, ensuring a certifiable purity level and a proper volume. Another feature of the invention is that all hazardous materials are retained within this module eliminating the need for a scrubber under normal spacecraft fuel loading operations.

It is an advantage of the invention that the module is a secondary containment vessel providing operator protection. Another advantage is that the module does not require pumps or other electrical equipment. This minimizes the risk of an explosion in the presence of an electric spark and facilitates fueling at remote locations. Still another advantage is that all fuels are pre-weighed. The operator need only open and close valves in a specified sequence to successfully fuel the space craft.

In accordance with the invention, there is provided a module for the transport of hazardous materials. This module includes a base and a removable cover. The removable cover is hermetically sealed to the base and the combination of the base and the cover defines an enclosure. Encased within this enclosure are a pressurized gas cylinder, a fuel tank and an evacuated vessel. A first conduit connects the pressurized gas cylinder to the fuel tank. A second conduit connects the fuel tank to an external site line and a third conduit connects the evacuated vessel to the second conduit.

The above stated objects, features and advantages will become more apparent from the specification and drawings that follow.

DETAILED DESCRIPTION

Figure 1:
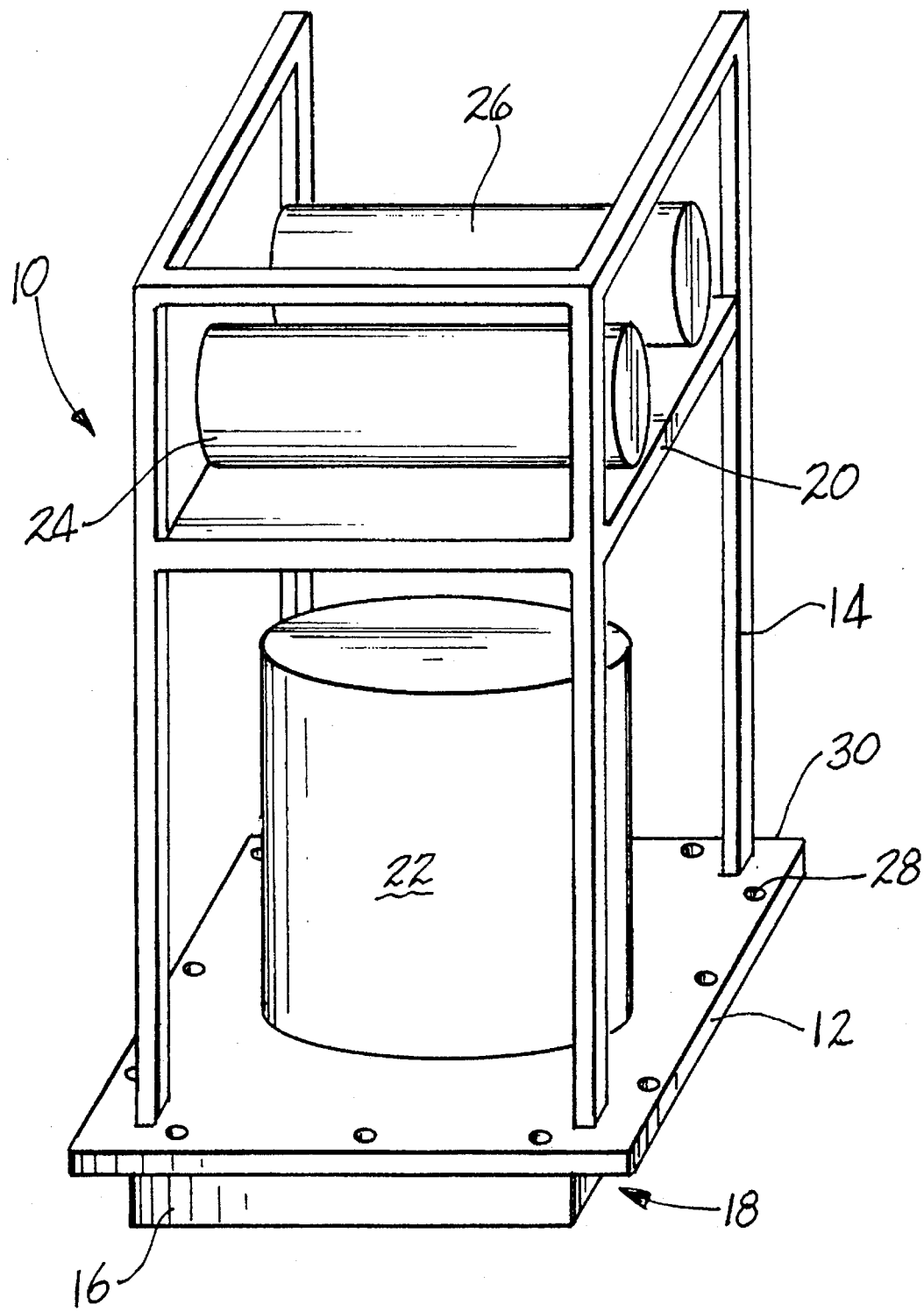
FIG. 1 is a perspective illustration of a module base supporting a fuel tank, a pressurized gas cylinder and an evacuated vessel.

FIG. 1 is a perspective illustration of the base 10 of a module for the transport of hazardous fluids, including liquids, gases and gels. The base 10 includes a support platform 12 and a frame 14 extending perpendicularly from an upper surface of the support platform 12. Mounted to a bottom surface of the support platform 12 may be wheels (not shown), a protrusion 16 defining an indent 18 or any other suitable means to facilitate transport of the module.

Mounted to the frame 14 and running generally parallel to the support platform 12 are preferably one or more shelves 20. The support platform 12, the frame 14 and the one or more shelves 20 are formed from any material that can support the weight of a fuel tank 22, a pressurized gas cylinder 24 and an evacuated vessel 26. Typically, the fuel tank, when filled with a liquid propellant such as hydrazine ($N_2H_4$) weighs between 400 pounds for a 35 gallon tank and 1600 pounds for a 120 gallon tank. The pressurized gas cylinder 24, typically filled with compressed nitrogen or helium, weighs about 10 pounds and the evacuated vessel typically weighs about 10 pounds. Any material that can support these weights and is not chemically attacked by the fuel or the pressurized gas, may be utilized for the base components.

Preferred material for the components of the base 10 include aluminum, aluminum alloys and stainless steel. One exemplary stainless steel is that designated by the American Iron and Steel Institute (AISI) as type 304L (nominal composition by weight 18%–20% chromium, 8.0%–12.0% nickel, a maximum of 0.03% carbon and a maximum of 0.5% molybdenum). The stainless steel has a thickness of from about 1/16 inch to about 1/4 inch.

The base 10 is assembled by welding the support platform 12 to the frame 14 and the shelves 20 to the frame 14.

The base 10 has a plurality of bolt holes 28 disposed around a peripheral flange 30 to seal a cover to the base 10.

Figure 2:
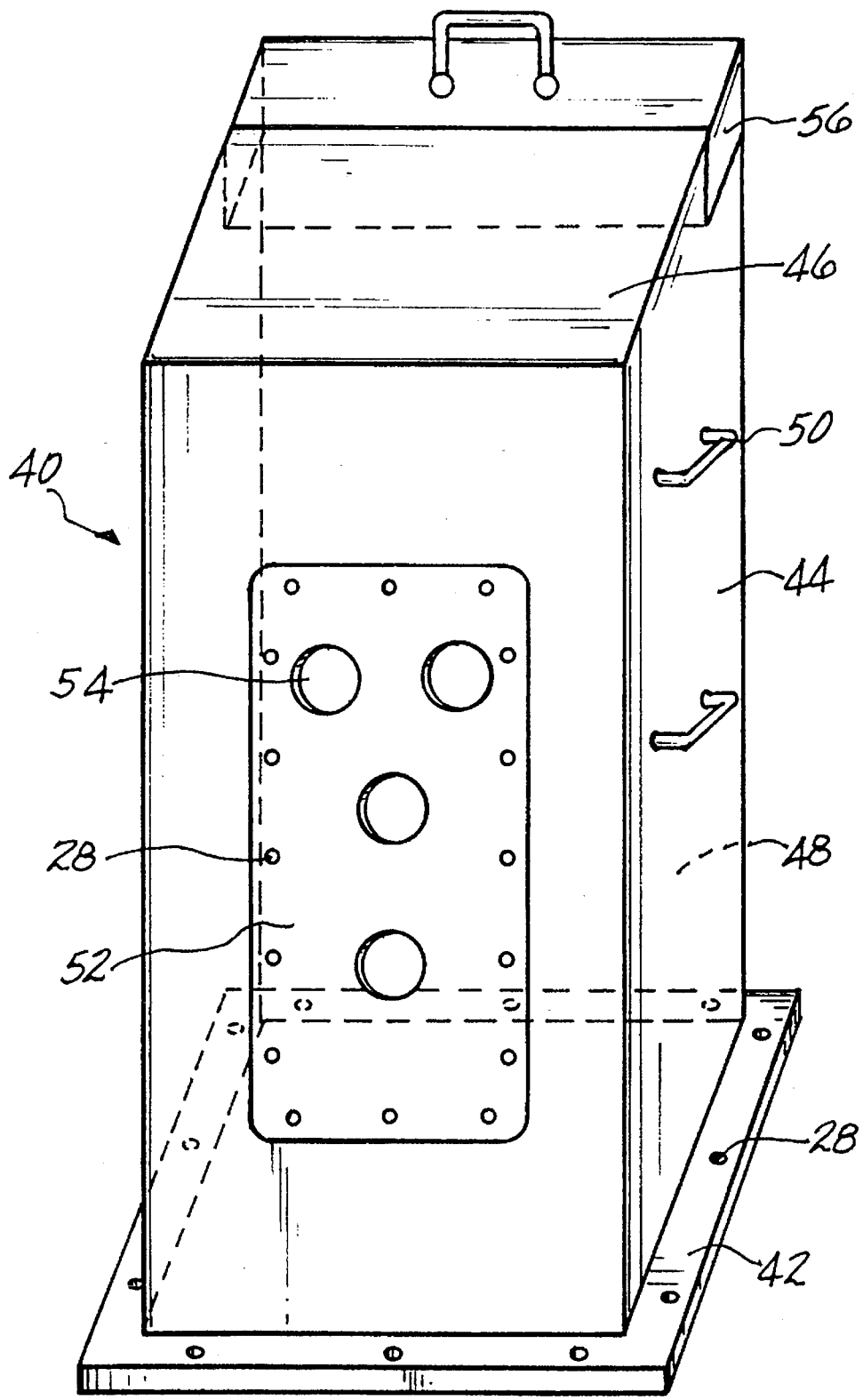
FIG. 2 is a perspective view of a cover that in combination with the base defines a hermetic enclosure.

FIG. 2 schematically illustrates a removable cover 40 for the module. The cover 40 has a peripheral flange 42 with bolt holes 28 in alignment with the bolt holes of the base. Extending generally perpendicularly from the peripheral flange 42 are sides 44. A top plate 46 spans the sides 44 defining an interior enclosure 48. When the cover 40 is sealed to the base, the interior enclosure 48 is essentially hermetic. A rubber or metal gasket may be disposed between the flange 42 and the base to improve hermeticity.

The requirements for the cover are similar to those for the base and similar materials are used for the cover 40. The cover must withstand contact with the chemicals contained within the interior enclosure 48 and the strength of the cover must be sufficient that the module can be lifted, such as by handles 50. Preferably, the cover 40 is also formed from aluminum, an aluminum alloy or a stainless steel such as AISI type 304L stainless steel.

The cover 40 includes one or more access plates 52 hermetically sealed to a side 44 such as by bolts extending through bolt holes 28. The access plates 52 include entry ports 54 providing an operator with access to the interior enclosure 48 while retaining hermeticity. The access port 54 may include hermetically sealed rubber gloves to permit the operator to manipulate the contents of the interior enclosure 48 without exposure to the hazardous materials. Alternatively, the access port 54 may comprise a hermetic joint coupled to a valve stem permitting the operator to manipulate valves contained within the interior enclosure. As another alternative, the access port 54 may be a sheet of glass or other chemically compatible transparent material permitting the operator to observe gauges and valves contained within the interior enclosure 48.

A glove box 56 joined to the cover 40 contains access ports to transport fluids between the interior enclosure 48 and an external site as described below.

Figure 3:
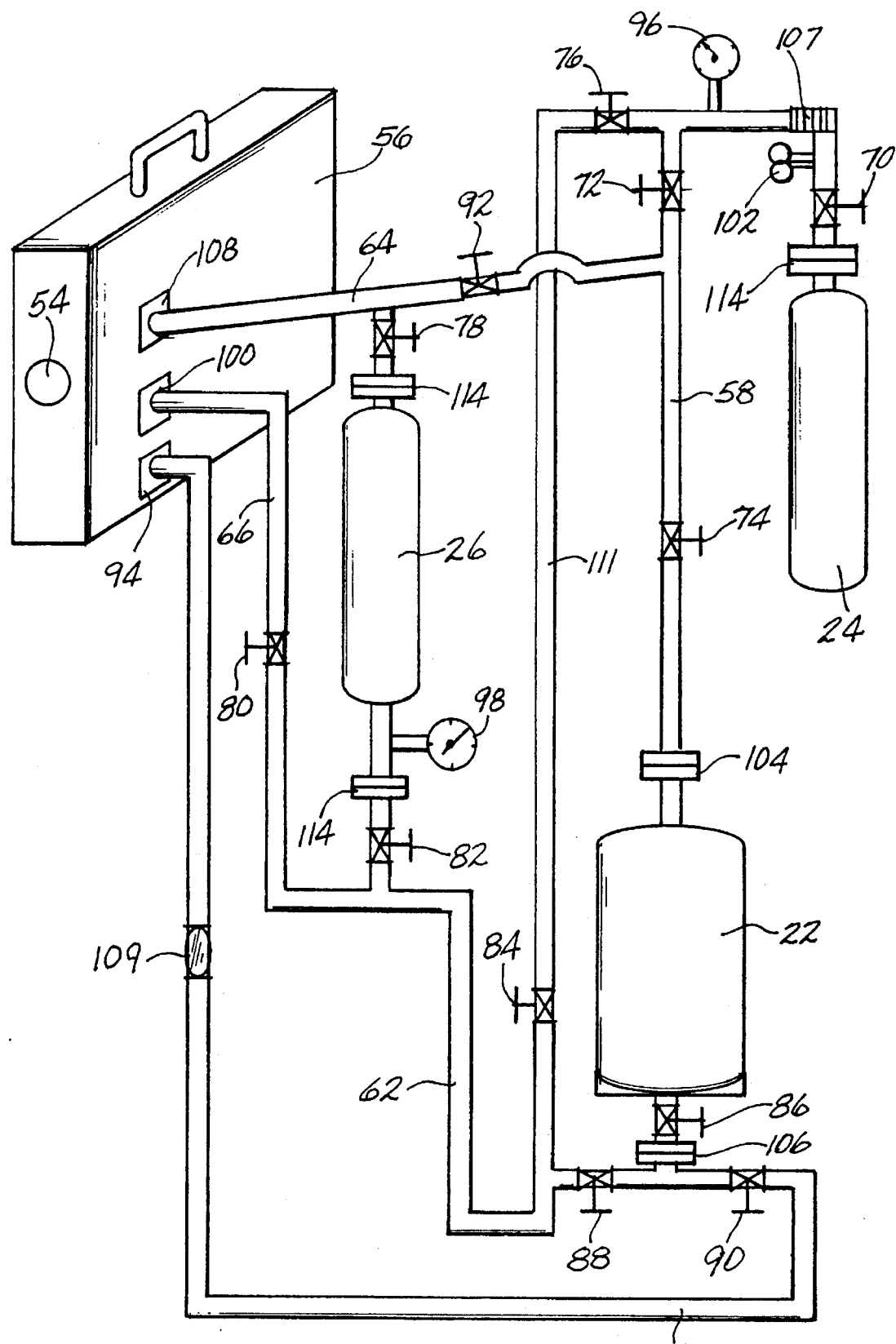
FIG. 3 schematically illustrates conduits for the transfer of fluids between the pressurized gas cylinder, the fuel tank, the evacuated vessel and an external site.

FIG. 3 schematically illustrates the relationship between the fuel tank 22, the pressurized gas cylinder 24 and the evacuated vessel 26, utilizing a bottom outlet fuel tank. As discussed below, other types of fuel tanks are equally acceptable.

A first conduit 58 connects the pressurized gas cylinder 24 to the fuel tank 22. A second conduit 60 connects the fuel tank 22 to an external site line. A third conduit 62 connects the evacuated vessel 26 to the second conduit 60. The conduits are preferably stainless steel, such as AISI 304L, tubing having an inside diameter between about 1/32 inch and 1/2 inch. The tube wall is sufficiently thick to accommodate pressures in excess of 500 psi.

Three conduits extend into the glove box 56. An emergency scrubber or auxiliary conduit 64, an evacuation conduit 66 and the second conduit 60.

When the module is used to fuel a space craft, the fuel tank 22 is filled with, for example, 30 gallons (240 pounds) of hydrazine. The mass and purity of the hydrazine is carefully monitored before filling the fuel tank 22. The quantity and purity is maintained by filling under laboratory, rather than field, conditions. The pressurized gas cylinder 24 is filled with an inert gas such as nitrogen or helium to a pressure of from about 1000 to about 5000 psi. To ensure removal of all liquid from the fuel tank 22, preferably inert gas from the pressurized cylinder is introduced to the fuel tank 22 at a pressure in excess of 15 psi and typically, at a pressure of from about 20 to about 80 psi.

The evacuated vessel 26 has a size sufficient to accommodate any hazardous fluids that dwell in any of the conduits, lines, tanks or vessels. The evacuated vessel 26 is drawn to a vacuum of at least one half atmosphere and preferably from about 0.9 to about 1.0 atmosphere.

When the module is transported, the valves (reference numbers 70–90) are closed. The module is transported to the space craft and a space craft fueling line (second conduit 60) is joined to a coupling 94. To fuel the space craft, a first valve 90, a second valve 86, a third valve 74 and a fourth valve 72 are opened. These valves may be mechanically actuated by an operator turning a valve stem, electromechanically actuated, pneumatically actuated or any other suitable type of valve.

Fueling is commenced by opening the fifth valve 70, exposing the pressurized inert gas within the pressurized vessel 24 to the liquid fuel contained within the fuel tank 22 by the first conduit 58. A gas regulator 107 limits the amount of gas that can flow from the pressurized cylinder 24 to the fuel tank 22. A pressure gauge 96 is visually monitored to ensure a positive pressure is maintained to ensure complete expulsion of fluids contained within fuel tank 22 in the direction of the second conduit 60 as opposed to backfilling the first conduit 58. A visual flow indicator 109, such as a rotating pin wheel behind a sight glass, may be inserted into the second conduit 60 to confirm the flow of the liquid fuel.

Once the pressurized fuel from the fuel cylinder has been completely transferred to the space craft, the following sequence is commenced to pressurize the space-craft fuel tanks with inert gas.

Fourth valve 72 and second valve 86 are closed to isolate the fuel cylinder. If the space craft is to be pressurized with an inert gas through the second conduit 60, sixth valve 88, first valve 90, seventh valve 84 and eighth valve 76 are opened.

If the space craft is to be pressurized with inert gas through the evacuation conduit 66, ninth valve 80, seventh valve 84 and eighth valve 76 are opened. The gas regulator 107 setting is adjusted to the required space craft tank pressure to allow the correct mass of inert gas to flow from the pressurized gas cylinder 24 to the space craft tank.

While the mass of the pressurized gas contained in the pressurized gas cylinder 24 is sufficient to theoretically expel all fluid from the fuel tank, a small amount of residual fluid remains in the second conduit 60. To prevent contamination of the environment by this residual fluid, the following sequence is commenced.

The fifth valve 70 is closed to isolate the pressurized gas cylinder 24. The fuel tank is isolated by closing the second valve 86 and the fourth valve 72. Ninth valve 82, seventh valve 84, sixth valve 88, first valve 90 and eighth valve 76 are opened, exposing the second conduit 60, the bypass conduit 111, the third conduit 62 and the first conduit 58 to the vacuum of the evacuated vessel 26. The vacuum contained in the evacuated vessel 26 draws all residual positive pressure from the open conduits to prevent liquid or vapor release to the environment during disconnection of the fuel line (second conduit 60) to the space craft. The vacuum is monitored by a pressure gauge 98 to ensure that the negative pressure is sufficient to draw all positive pressure from the opened conduits and lines.

If the pressure gauge 98 does not indicate adequate negative pressure, an external vacuum hose may be coupled to the evacuation line 66 through coupling 100. The ninth valve 82 is then closed and the tenth valve 80 is opened. An external vacuum withdraws any residual positive pressure from the conduits and lines. The module is then withdrawn from the space craft fueling area and returned to a refilling site. All valves are closed.

The pressurized gas cylinder 24 is then removed from the module and replaced with a fully charged gas cylinder.

The fuel tank 22 and the conduits are flushed with a cleaning solution and thoroughly dried prior to refueling. The fuel tank 22 is refueled by providing a liquid fuel source to the coupling 100 and opening the tenth valve 80, the sixth valve 88 and the second valve 86 to permit the inflow of a pressurized mass of fluid. This fluid is verified to meet the required purity prior to refueling of the fuel tank.

Alternatively, the first conduit 58 is provided with a first disconnect 104 and a second disconnect 106 to permit ready removal of the fuel tank 22 and replacement of the empty fuel tank with a filled fuel tank. Disconnects 114 are also provided to facilitate removal of the pressurized gas cylinder 24 and the evacuated vessel 26.

The evacuated vessel is then drawn to a suitable vacuum by joining an external vacuum to the coupling 100 and opening the tenth valve 80 and the ninth valve 82 to draw a sufficient vacuum. All valves are then closed and the module is ready for refueling a second space craft.

The eleventh valve 78 and the twelfth valve 92 are normally closed. These valves are opened in the event that an auxiliary fuel or inert gas source is required, or an external scrubber is needed. One or more pressure relief devices 102, such as rupture disks, relief devices, or the like, are mounted near the pressurized gas cylinder 24 for safety by providing over-pressure relief.

Figure 4:
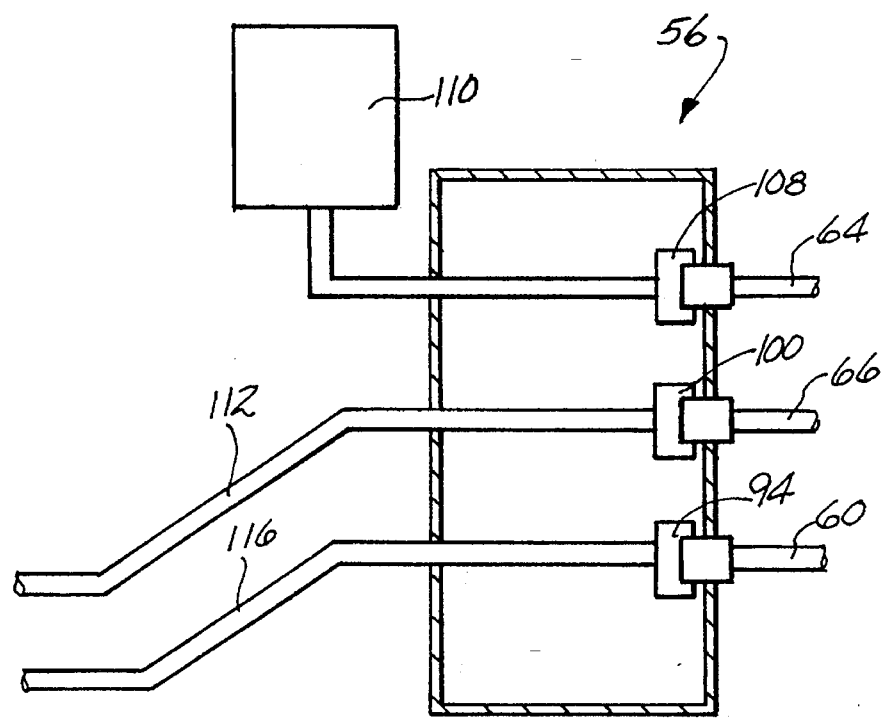
FIG. 4 schematically illustrates the interface between the module of the invention and the external site.

The glove box 56 which preferably contains one or more entry ports 54 is described in more detail in FIG. 4. Entering the glove box 56 from the module side are the auxiliary conduit 64, the evacuation conduit 66 and the fueling (second) conduit 68. A coupling 108 joins the auxiliary conduit 64 to an external device such as a conventional scrubber 110. In the event that the scrubber 110 is required to contain a gas leak, the scrubber is subsequently disposed or remediated in compliance with environmental laws and regulations.

The coupling 100 joins the auxiliary conduit 66 to an external recharging line 112 used to fill the module and to evacuate the module after use. The satellite fueling conduit 60 is joined by coupling 94 to a satellite fuel hose 116 that is attached to the space craft fueling port.

The flammable nature and environmental toxicity of hydrazine mandates that as much fuel as possible is expelled from the fuel tank. Applicants established that improved expulsion is obtained when the pressure in the pressurized vessel exceeds the holding tank pressure by about 15 psi as illustrated by the Example that follows.

EXAMPLE

Figure 5:
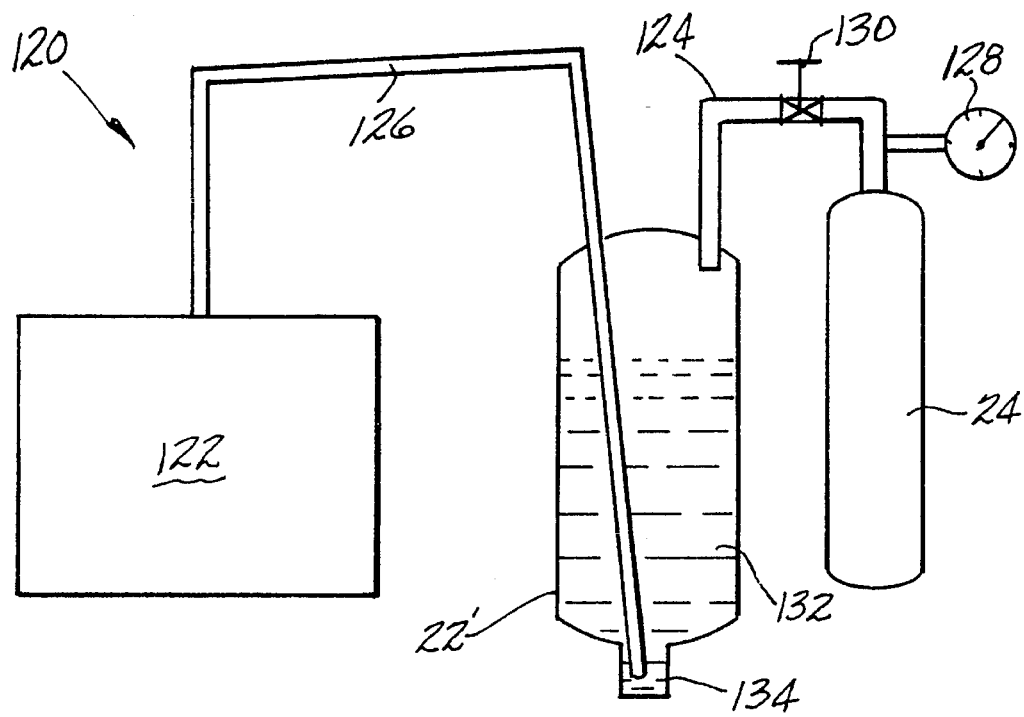
FIG. 5 schematically illustrates an alternative arrangement employing a dip tube fuel tank.

An experimental setup 120, illustrated in FIG. 5, includes a pressurized cylinder 24 pressurized to a desired pressure ($P_{REG}$). Connected to the pressurized cylinder by a first conduit 124 is a dip tube fuel tank 22' that has an outlet for the expulsion of liquid fuel from the top of the fuel tank 22'. A holding tank 122 simulates the fuel tank of a space craft and is pressurized to a desired pressure ($P_{AD}$). A second conduit 126 connects the fuel tank to the holding tank 122. The pressure contained within the pressurized vessel 24 was monitored on pressure gauge 128. The fuel tank 22' was filled with 211 pounds of water at 15° C. Water was selected because the density and viscosity of water are similar to those of hydrazine.

Opening the valve 130 directed the pressurized inert gas contained within the pressurized vessel 24 into the fuel tank 22' expelling the water 132 through the second conduit 126 into the holding tank 122. The amount of water remaining in the heel 134 of the fuel tank 22' was measured, using a dip stick having increments to the nearest 1/16 inch.

As shown in Table 1, increasing the pressure, $P_{REG}$ from 10 psig to 20 psig, reduced the heel height by approximately 50%.

TABLE 1

| RUN | $P_{AD}$ (psig) | $P_{REG}$ (psig) | HEEL (inch) | HEEL (fl oz) |
| --- | --- | --- | --- | --- |
| 1 | 0 | 10 | 1.5" | 4.86 |
| 2 | 10 | 20 | 7/8" | 1.46 |
| 3 | 10 | 20 | 13/16" | 1.55 |
| 4 | 10 | 10 | 1 7/16" | 4.5 |

While the invention has been described most particularly in terms of a self-contained module for the transport of space craft propellants, the module is equally suitable for the transport of other toxic materials such as corrosive chemicals, flammable materials and radioactive materials.

It is apparent that there has been provided in accordance with this invention a self-contained module for the transport of hazardous fluids that fully satisfies the objects, features and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A module for the transport of hazardous fluids, comprising:

a base;

a removable cover hermetically sealed to said base, the combination of said base and said cover defining an enclosure;

a pressurized gas cylinder, a fuel tank and an evacuated vessel encased within said enclosure;

a first conduit connecting said pressurized gas cylinder with said fuel tank;

a second conduit connecting said fuel tank to an external fuel hose; and a third conduit connecting said evacuated vessel to said second conduit.

2. The module of claim 1 wherein said cover includes one or more entry ports providing an operator with access to said enclosure while retaining hermeticity.

3. The module of claim 1 wherein an auxiliary conduit connects said first conduit and said evacuated vessel to a scrubber external to said enclosure.

4. The module of claim 1 wherein at least one pressure relief device is adjacent the pressurized gas cylinder and said pressure relief device opens when the pressure in said module conduits exceeds a specified value.

5. The module of claim 1 wherein an evacuation line connects said third conduit to an external recharging line.

6. The module of claim 1 wherein a first disconnect and a second disconnect are located adjacent to said fuel tank and are effective to remove said fuel tank from said first conduit and from said second conduit.

7. The module of claim 4 wherein said fuel tank contains hydrazine, said pressurized gas cylinder contains an inert gas under a pressure of in excess of 1000 psi and said evacuated vessel contains a vacuum of at least 0.5 atmosphere.

8. The module of claim 7 wherein said base and said cover are stainless steel having a thickness of from about 1/16 inch to about 1/4 inch.

9. The module of claim 7 wherein said first conduit, said second conduit and said third conduit are stainless steel and independently have an inside diameter of from about 1/32 inch to about 1/2 inch.

10. A method for the disposal of a hazardous fluid, comprising:

providing a fuel tank containing said hazardous fluid, a pressurized gas cylinder containing an inert gas and an evacuated vessel;

connecting said fuel tank to said pressurized gas cylinder by a first conduit containing a first valve;

connecting said fuel tank to a fuel hose by a second conduit containing a second valve;

connecting said second conduit to said evacuated vessel by a third conduit containing a third valve;

opening said first valve and second valve to expel said hazardous fluid.

11. The method of claim 10 wherein following expulsion of said hazardous fluid, said first valve is closed and said third valve is opened to thereby purge residual hazardous fluid from said first conduit, said second conduit, said third conduit and said fuel tank.

12. The method of claim 11 wherein said pressurized gas cylinder is provided with a compressed inert gas at a pressure in excess of about 1000 psi.

13. The method of claim 12 wherein said pressurized gas cylinder is provided with a compressed inert gas at a pressure of from about 1000 psi to about 5000 psi.

14. The method of claim 12 wherein said evacuated vessel is provided with a vacuum of less than 0.5 atmosphere.

15. The method of claim 14 wherein said evacuated vessel is provided with a vacuum of from about 0.9 to about 1.0 atmosphere.

16. The method of claim 14 wherein said first valve, said second valve and said third valve are mechanically actuated.

17. The method of claim 14 wherein said first valve, said second valve and said third valve are electromechanically or pneumatically actuated.

18. The method of claim 14 including the step of connecting an external recharging line to said third conduit to provide for external removal of residual hazardous fluids and to provide for the refilling of said fuel tank or said pressurized vessel.

19. The method of claim 14 wherein said hazardous fluid is selected to be hydrazine.

\* \* \* \* \*